Patented July 10, 1951

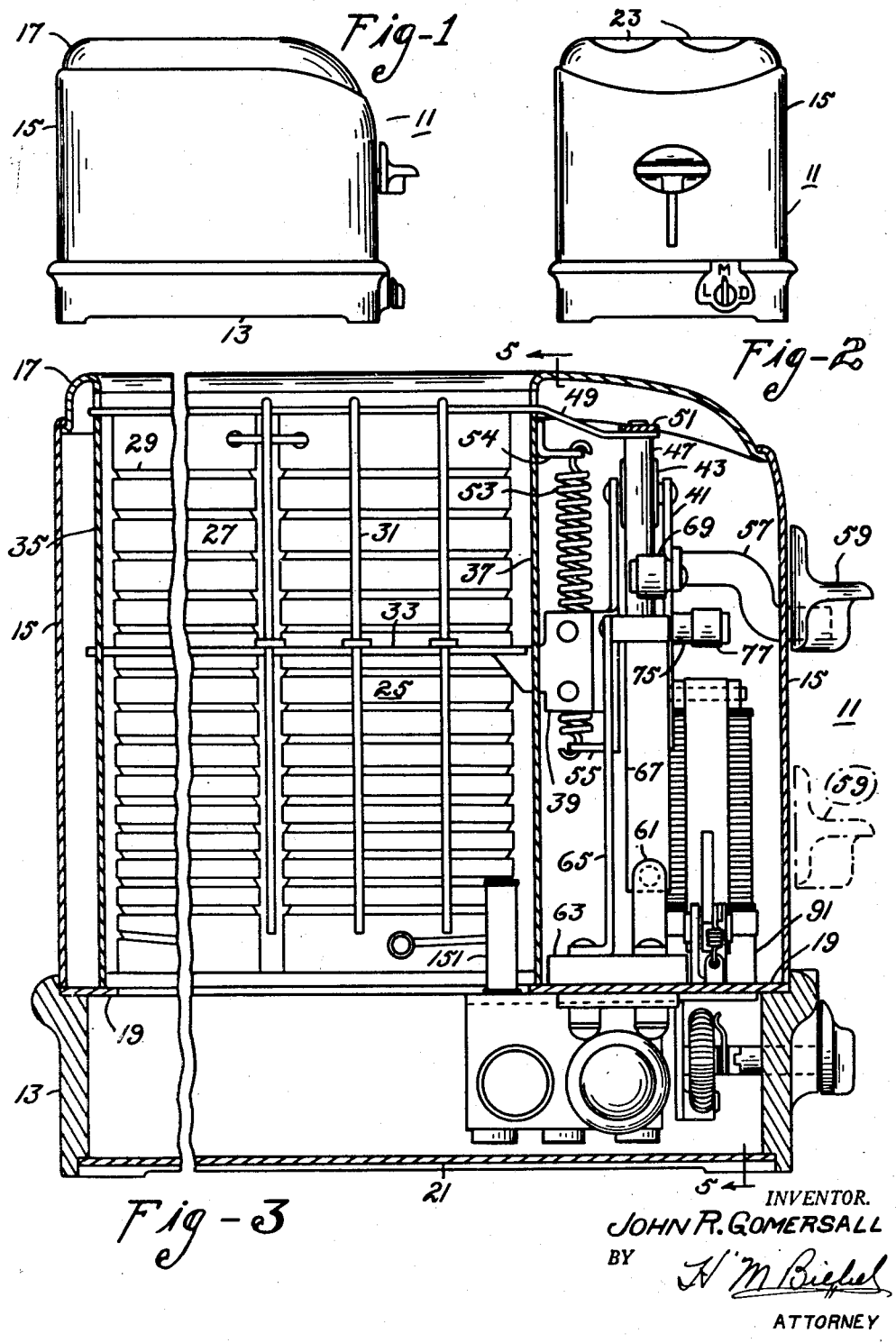

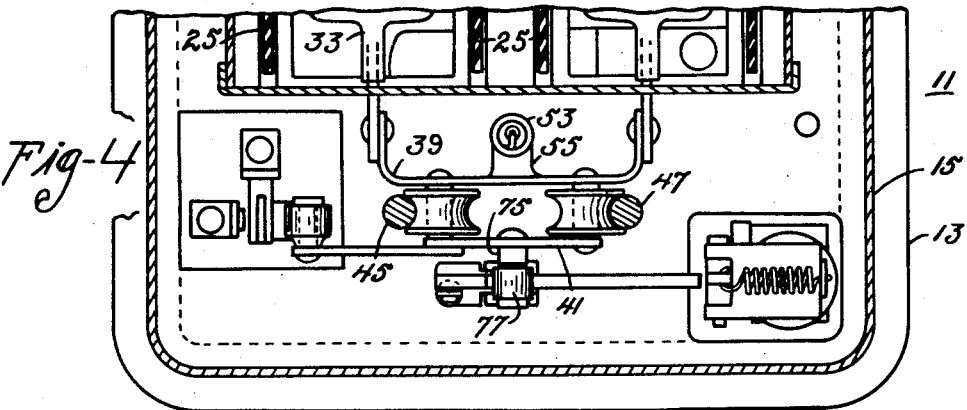
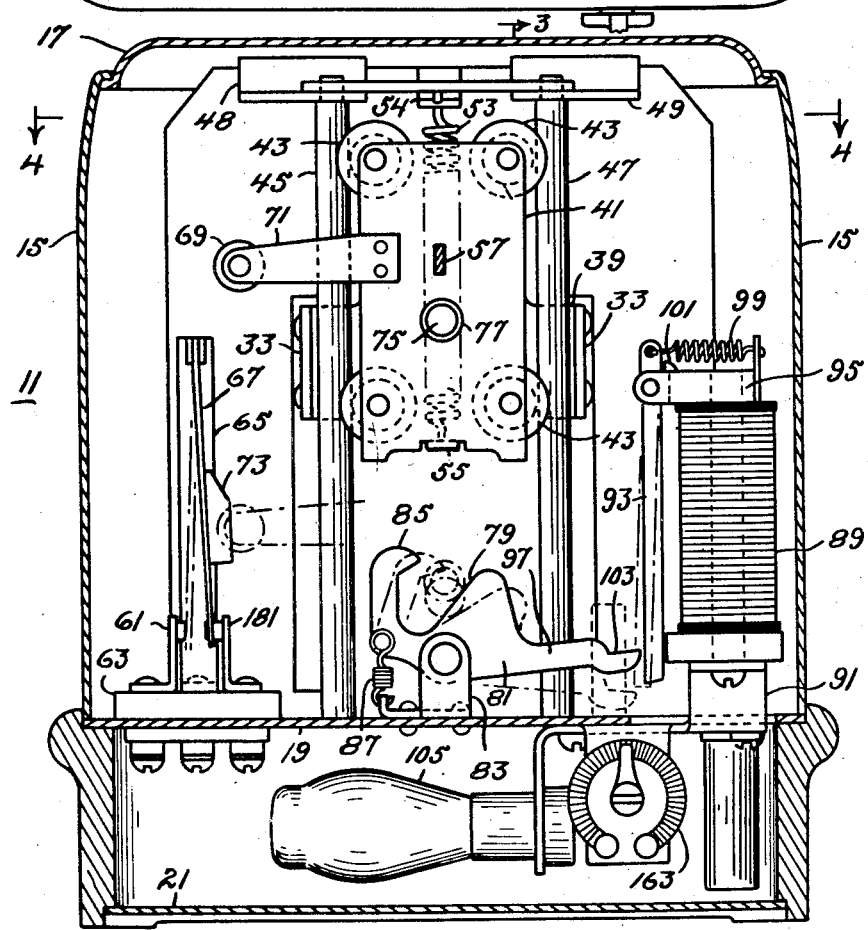

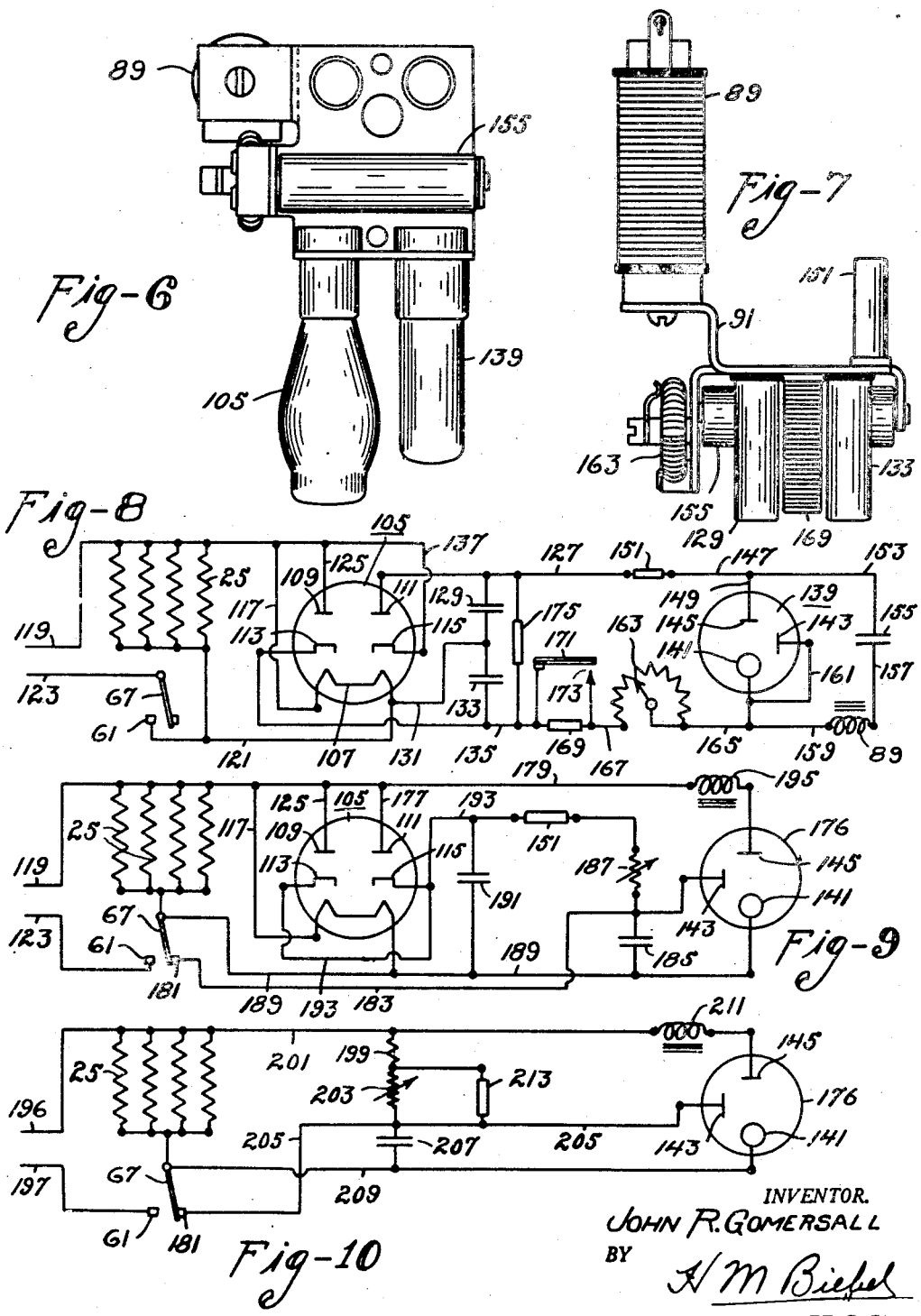

2,560,386

UNITED STATES PATENT OFFICE 2,560,386

AUTOMATIC ELECTRIC TOASTER

John R. Gomersall, Elgin, Ill., assignor to McGraw Electric Company, Elgin, Ill., a corporation of Delaware Application September 2, 1944, Serial No. 552,524

21 Claims. (Cl. 99—328)

My invention relates to automatic electric toasters and particularly to means for timing the duration of a toasting operation.

An object of my invention is to provide a timing means and a circuit therefor including an electron tube.

Another object of my invention is to provide a timing circuit, including an electron tube and means for varying the duration of a toasting operation to compensate for temperature changes of the toaster structure and different circuit voltages and to permit of obtaining different degrees of toasting as desired by the user.

Other objects of my invention will either be apparent from a description of several forms of circuits embodying my invention or will be pointed out in the course of a description thereof and set forth more particularly in the appended claims.

Among the timers now in use on automatic toasters may be mentioned the clock timer and thermal timers of several various kinds, one of these being dependent upon the temperature of the surface of a slice of bread being toasted, and another thermal timer comprises a bimetal bar which is first heated and is then permitted to cool, the toasting operation being terminated by the bimetal bar when it has cooled to a predetermined relatively low temperature.

In contradistinction to this, my invention provides a novel form of timer comprising an electron tube which is shown as a gas filled grid glow discharge tube. While I am disclosing in the instant application the use of a particular type of electron tube, I do not desire to be limited thereto, since other similar forms of electron tubes may be substituted in place thereof, the primary consideration being that the electron tube, constituting a timing means, is normally non-conducting and that means are provided for ensuring that the tube shall become conducting after a predetermined length of time, which is the duration of a toasting operation.

Referring to the drawings,

Figure 1 is a view in side elevation of a toaster structure embodying my invention and shown on a reduced scale, Fig. 2 is a front elevational view of the toaster shown in Fig. 1, Fig. 3 is a longitudinal, vertical, sectional view through a toaster casing taken on the line 3—3 of Fig. 5, Fig. 4 is a fragmentary, horizontal view taken on the line 4—4 of Fig. 5, Fig. 5 is a vertical, sectional view taken on the line 5—5 of Fig. 3, Fig. 6 is a bottom plan view of the timing elements, Fig. 7 is an end view of the timing elements, Fig. 8 is a diagram of the electric circuits of the timing elements, Fig. 9 is another diagram of electric circuits embodying my invention, and, Fig. 10 is a diagram of electric circuits when direct current is employed.

Referring first of all to Figs. 1 and 2 of the drawings, I have there shown a standard form of domestic electric automatic toaster 11, comprising a base frame 13 which may be of molded composite material and which has positioned on the top of said molded frame an outer casing 15 and an upper cover member 17. The toaster structure includes also a base plate 19, as well as a bottom plate 21, each of relatively thin sheet metal. The elements 13, 15, 17, 19, and 21 may be secured together in proper operative position by any means now well known in the art.

I have elected to show a two-slice toaster, and the cover 17 is therefore provided with two openings 23 in its upper face for the introduction of slices of bread into the two toasting chambers within the toaster and the removal of the toasted slices of bread from the toasting chamber at the close of a toasting operation.

I provide two pairs of vertical, planar, electric heating elements 25 (Fig. 4), which include one or more sheets of mica 27 (Fig. 3), having wound thereon a resistor strip 29, the respective strips 27 being held in proper operative position relatively to each other and in the toaster by any suitable means now well known, and the upper and the lower end portions of the sheets 27 being held by any suitable means. I provide further a plurality of vertical guide or guard wires 31 supported in a manner now well known in the art.

I provide a pair of bread carriers 33, one in each of the toasting chambers between the respective pairs of heating elements 25. The rear end portions of the carriers 33 extend through a rear intermediate wall 35, while the front portions extend through a front intermediate wall 37, vertical slots being provided for such purposes in the rear and front intermediate walls. The front portions of the bread carriers 33 are connected by a rear carriage plate 39 which is secured to a front carriage plate 41, these plates being of substantially rectangular shape and having grooved rollers 43 rotatably mounted between them adjacent to each of the respective upper and lower corners. I provide a pair of vertically-extending rods 45 and 47, the lower ends of which are adapted to be fitted into plate 19, while the upper ends thereof are adapted to fit into the front end portions of top frame plates 48 and 49, a cross bar 51 being provided to maintain the two rods 45 and 47 in predetermined fixed positions relatively to each other so that the carriage plate 39 of the two carriers 33 may be easily and freely movable vertically on the two rods 45 and 47.

A tension spring 53 has its upper end connected to a bracket 54, while its lower end is connected to a rearwardly-extending lug 55 secured to or integral with the bottom portion of rear carriage plate 39, whereby the carriers are biased to their upper or non-toasting position. I provide a forwardly-extending arm 57 secured to carriage plate 41 and extending outwardly through a vertical slot in the front wall of casing 15 and having an actuating knob 59 secured thereto outside of the front wall of the casing to permit of an operator moving the bread carriers from their normal non-toasting upper position, downwardly into their lowered toasting position, all as now well known in the art.

I provide a control switch for the toast heating elements 25 comprising a fixed contact 61 mounted on a block 63 of electric-insulating material secured to and against the upper face of plate 19. I provide further an upwardly-extending bar 65 having a contact arm 67 secured to its upper end (Fig. 5), the arm depending therefrom and being adapted to be moved by a roller 69 rotatably mounted on an arm 71 extending in a left hand direction from carriage plate 41. Roller 69 is adapted to engage a cam plate 73, of electric-insulating material, secured to the right hand surface of contact arm 67 so that upon downward movement of carriage plate 41 and carriers 33, contact arm 67 will be moved in a clockwise direction and into engagement with fixed contact 61 to close the circuit through the toast heating elements to start a toasting operation.

Carriage plate 41 has mounted thereon a short stub shaft 75 having a roller 77 rotatably mounted thereon, which roller is adapted to engage the inclined upper surface 79 of a pivotally mounted latch arm 81, thereby to rotate the latch arm to the latching position shown in dotted lines in Fig. 5. The latch arm 81 is rotatably supported on a bracket 83 secured to the upper surface of plate 19. The latch arm 81 includes also a release portion 85 extending in substantially the same general direction as the surface 79 and is adapted to be engaged by roller 77 when moved upwardly in order to permit of the return of the bread carriers 33 to their upper non-toasting position. Latch arm 81 is biased into the open position by a spring 87 secured thereto. I provide further an electromagnetic latch release shown particularly in Fig. 5 of the drawings as comprising a coil 89 mounted on a bracket 91, which is adapted to be secured to the bottom surface of plate 19. A latch arm 93 is pivotally mounted on a block 95 at the upper end of coil 89 and is adapted to be biased into a position to engage the right hand end portion 97 of latch arm 81 by a coil spring 99. The arm 93 of the electromagnetic latch release means is adapted to engage a small stop lug 101 mounted on the upper part of block 95, and when an operator presses downwardly on knob 59, with attendant downward movement of the carriers 33 and of the roller 77 against surface 79 of arm 81, the end portion 97 will be caused to turn in a clockwise direction until its upper surface 103 is positioned below the lower end of arm 93. Simultaneously with the lowering of the bread carriers 33 into their toasting position, roller 69 on arm 71 causes engagement of contact arm 67 with fixed contact 61, whereby energization of the toast heating elements 25 is effected. Upon later energization of coil 89 by a current traversing the same, arm 93 is moved magnetically in a counter-clockwise direction out of engagement with the upper surface 103 of the right hand end portion 97, permitting spring 53 to cause quick return of carriage plate 41 and the parts connected therewith into their upper position.

While I have illustrated and described a specific embodiment of bread carriers, carriage plates, vertical rods, heating element control switch, and a latch for holding the carriage plate of the carriers in their lowered toasting positions, I do not desire to be limited thereto, since I may use other elements operable for the same general purpose and wish to here point out that all of these elements are old and well known in the art.

Fig. 8 shows a voltage doubler arrangement connected in parallel with the toast heaters, the voltage doubler comprising the usual double-diode rectifier tube, the usual pair of condensers connected in series and shunted by a usual resistor, the two condensers being charged on the alternate half cycles. It is contemplated that the resistor will have a sufficiently high ohmic value to permit the two condensers to stay at nearly peak potential of the alternating current so that the resulting potential across the two condensers in series will be approximately 300 volts.

I have illustrated one form of timing circuit and timing means embodying my invention. I provide a rectifier doubler electron tube 105, this tube comprising a hot filament 107, two plates 109 and 111, as well as two cathodes 113 and 115. This tube is a standard article of commerce, and I prefer to use this tube in order to obtain a relatively high direct current potential for use in the circuit now to be described. The hot filament 107 is connected by a conductor 117 to one conductor 119 of a supply of alternating current potential, while its other end is connected by a conductor 121 to fixed contact 61 of the control switch for the toast heating elements, the contact arm 67 being connected to the second supply circuit conductor 123 of the alternating current source of supply of electric energy. Plate 109 is connected by a conductor 125 to supply circuit conductor 119, while plate 111 is connected by a conductor 127 to one terminal of a filter condenser 129, the other terminal of filter condenser 129 being connected by a conductor 131 to conductor 121. A second filter condenser 133 has one terminal thereof connected to conductor 131 and to a terminal of condenser 129, while its other terminal is connected to a conductor 135, the other terminal of the conductor being connected to cathode 113. The second cathode 115 is connected by a conductor 137 to supply circuit conductor 119. It is obvious that the two filter condensers 129 and 133 are needed because of the rectifier doubler electron tube 105 and that the voltage between conductors 127 and 135 is on the order of 300 volts direct current.

I provide preferably a gas type glow discharge tube 139 having a cold cathode 141, a grid 143, and a plate anode 145. This electron tube is also a standard article of commerce. The plate 145 is connected to a conductor 147 by a conductor 149, the other end of conductor 147 being connected to a compensating resistor 151, the other terminal of which is connected to conductor 127. A conductor 153 has one end thereof connected to the junction of conductors 147 and 149, while its other terminal is connected to one terminal of an electrostatic timing condenser 155. The other terminal of condenser 155 is connected by a conductor 157 to one terminal of coil 89 of the electromagnetic release means, the other terminal of which is connected by a conductor 159 to the cold cathode 141. A conductor 161 connects the cold cathode and conductor 159 to the starting anode 143. I provide also a manually-adjustable timing resistor 163, one terminal of which is connected to electrode 141 and conductor 159 by a conductor 165. The other terminal of timing resistor 163 is connected by a conductor 167 with a compensating resistor 169, the other terminal of which is connected to conductor 135 and therefore to one terminal of the filter condenser 133.

Let it now be assumed that a user of the toaster embodying the circuit disclosed in Fig. 8 desires to toast one or two slices of bread placed upon the carriers 33 through the openings 23 in the cover of the outer casing. He will press downwardly on knob 59, causing downward movement of the carriers into toasting position in the toasting chamber and closure of the main switch, comprising particularly contact arm 67 and fixed contact 61, thereby energizing not only the toast heating elements 25 but also the rectifier doubler electron tube 105, which is immediately effective to provide successive half waves of rectified direct current potential across the electrodes 111, 115, and 109 and 113 to charge the filter condensers 129 and 133. The direct current potential provided through the conductors 127 and 135 to the filter condensers 129 and 133 will be on the order of 300 volts. This voltage will be effective to gradually charge the timing condenser 155, the current applied to the terminals of the condenser 155 being relatively small because of the fact that the current applied to the timing condenser 155 has to traverse the resistors 151, 169, and 163, as well as the resistance of the coil 89. The potential across the terminals of the electrostatic condenser 155 is gradually increased as the charge accumulates thereon. It has been hereinbefore stated that the electron tube 139 is normally nonconducting, and I use this phraseology to point out that while a relatively very small current can traverse the electron tube 139 before it has been fired or rendered conducting, the amount of such current is infinitesimal, so small in fact that it cannot effect any action of the kind which I wish to effect when the tube becomes conducting. The resistance of the manually-adjustable timing resistor 163 may be on the order of 10 megohms and the resistance of the resistor 169 may be on the order of 2 or 3 megohms, while the resistance of the compensating resistor 151 may be on the order of 5 megohms. The use of resistor 169 is called for because of the fact that it is possible, although not advisable, to cut out substantially all of the resistance of the timing resistor 163 so that it is necessary to leave a certain minimum resistance in the circuit to prevent damage to the electrodes of the electron tube 139. The capacitance of timing condenser 155 may be 3 microfarads and the condenser must be of high grade.

As has been hereinbefore stated, condenser 155 is gradually charged to a potential on the order of 225 volts, which when applied to the electron tube 139, and particularly to the electrodes 143 and 145 thereof, will be such as to effect breakdown or firing of the tube 139 with resultant conduction therethrough of current provided by the charged electrostatic condenser 155.

The current traversing the now conducting tube 139, after the same has been fired, traverses also coil 89, with the result that latch arm 93 is moved in a counter-clockwise direction out of holding engagement with latch arm 81, thereby permitting spring 53 to cause quick upward movement of the bread carriers 33 into nontoasting position, with attendant opening of the main switch comprising contact arm 67 and fixed contact 61, thereby terminating a toasting operation.

I have found that when a rectifier doubler electron tube, as shown and described in Fig. 8, and a gas triode glow discharge tube, as also shown in Fig. 8, and the resistors 151, 163 and 169, having values on the order as hereinbefore noted, are used, it will require a time on the order of two to three minutes to cause charging of the timing condenser 155 to a voltage at which the tube 139 fires or becomes conducting. It is possible, by selection of the resistance connected in circuit between the source of direct current potential comprising particularly the rectifier doubler tube and the filter condensers shown and the timing condenser 155, to vary the time of charging of the electrostatic condenser 155 to a potential at which the tube 139 becomes conducting or fires. If the resistor 163 is adjusted to include a relatively small amount of resistance in the circuit between the source of direct current potential and the condenser 155, the length of time required to charge the condenser 155 to a potential at which the tube 139 fires or becomes conducting is reduced, and the amount of toasting effected for otherwise similar conditions of the toaster structure will also be reduced. If, for instance, a user wanted light toast instead of medium, or medium toast instead of dark, all that would be necessary would be to reduce the resistance connected in circuit a proper amount, as by adjustment of resistor 163, with the attendant result that lighter or less toasted slices of bread would be obtained.

The resistor 151 is preferably made of a material having a negative temperature coefficient of resistance, an ohmic cold resistance on the order of 5 to 10 megohms, and is located in the toaster assembly so that it is subject to toaster chamber temperature, as is shown particularly in Fig. 3 of the drawings. During the first operation, that is when starting with a cold toaster structure, the resistance of resistor 151 will be a maximum, thereby causing the length of time necessary to charge condenser 155, to be a maximum, but because of its negative temperature coefficient of resistance, the resistance of resistor 151 will decrease with increasing temperature of the toasting chamber, so that the duration of a toasting operation will be decreased with increase of temperature of the toasting chamber. It is obvious that the coefficient of negative temperature changes of resistance of resistor 151 can be made such as to adapt it to the particular toaster structure with which it is to be operatively associated, so that substantially the same degree of toasting will be effected, irrespective of variations of temperature of the toaster structure.

The thermally-responsive resistor 151 is also effective to compensate for variable supply circuit voltages, that is if a toaster is connected to a source of supply of voltage of relatively high value, say on the order of 120 volts, where the ordinary standard is 110 volts, the heating elements will operate at relatively higher temperature, which will cause the temperature of the toasting chamber to be higher, so that in case a given degree of toasting, such as "medium" is desired, a shorter time should be provided by the timing means; and this will be done, because of the fact that the higher chamber temperature will cause a greater reduction of the resistance of resistor 151, with attendant shortening of the time provided by the timing circuit. If the toaster is connected to a source of supply of relatively low voltage, say on the order of 100 volts, the temperature of the heating elements energized from this lower voltage will be lower, and the chamber temperature will also be lower, whereby the resistance of the resistor will be increased with attendant increase in the length of time required to charge the condenser 155 to a potential at which the tube fires or breaks down. When the voltage of the supply circuit is high, more current flows through the resistors into the condenser 155 which is thus charged in a shorter time, while if the voltage of the supply circuit is low, less current will flow through the resistors into the condenser and it will require more time to charge condenser 155 to a given voltage. This effect is therefore additive to the effect of the compensating resistors.

Referring to the resistor 169, I have shown, in Fig. 8 of the drawings, a bimetal bar 171, which is connected to the terminals of the resistor 169, so as not to short circuit said resistance with a cold toaster assembly. The bimetal bar 171 is adapted to be positioned in the toasting chamber of a toaster and to be subject to the temperature thereof. The operation of this detail is substantially as follows: when starting toasting operation with a cold toaster, I have found it necessary, in some types and sizes of electric toasters, that the length of time of the first toasting operation with a cold toaster be relatively long; whereas for the second and other quickly succeeding toasting operations the length of time is much shorter, and in some cases may be constant. The normally open bimetal bar 171 permits the resistor 169 to be in circuit when starting toasting operations with a cold toaster, but either sometime during the last part of the first cycle of toasting or in the early part of the second cycle, the bimetal bar 171 will be moved into engagement with a fixed contact 173, whereby the resistor 169 is short circuited, with the result that the time necessary to charge the condenser 155 to a potential at which firing of the tube 139 will occur, will be reduced. The compensating resistor 151 which, as has hereinbefore been set forth, is positioned in the toasting chamber or is subject to the temperature thereof, will then act to reduce the length of time of a toasting operation in accordance with the increase in temperature of the toaster structure. It is obvious that modifications of one or the other of the resistors 151 and 169 may be made in order to obtain the desired result.

I have shown a resistor 175 connected to the two outer terminals of the two condensers 129 and 133, the resistance of the resistor 175 being on the order of from 2 to 10 megohms. During normal operation of the toaster and of the timing circuits shown in Fig. 8, the current traversing the resistor 175 is very small and will have no effect upon the operation of the timing circuit. However, when the toaster heating elements 25 are deenergized and the toaster is put away, the resistor 175 will act as a discharge resistor for not only the filter condensers 129 and 133, but also for the timing condenser 155.

Referring now to Fig. 9 of the drawings, I have there shown a gas triode glow discharge electron tube 176, which is used in combination with a rectifier tube 105 of substantially the same kind as that shown in Fig. 8, except that instead of being a rectifier doubler electron tube, the tube 105 is connected to rectify only substantially the single voltage of the supply circuit of alternating current voltage instead of double the same. The two plate electrodes 109 and 111 are connected by conductors 125 and 177 to a conductor 179, which is connected with the first supply circuit conductor 119. The tube 176 operates as a half wave rectifier, the D. C. voltage now available being on the order of 150 volts.

I have shown on Fig. 5 of the drawings a second fixed contact 181, which is adapted to be engaged by the biased contact arm 67 when the carriers are in their upper non-toasting position. Contact 181 is connected by a conductor 183 to the junction of a timing condenser 185 and a timing resistor 187, as well as to the grid 143 of tube 176. Contact arm 67 is connected by a conductor 189 to one terminal of the two filaments 107, as well as to the other terminal of timing condenser 185 and to cold cathode 141 of tube 176. A filter condenser 191 is connected to conductor 189 and to a conductor 193, which connects the two plates 113 and 115 to one terminal of a compensating resistor 151, the other terminal of which is connected to the adjustable timing resistor 187. The electromagnetic coil 195 is connected in circuit with plate 145 and conductor 179, and since it is traversed by pulsating current when fired, must be designed for such current.

If an operator desires to use a toaster embodying the timer circuit shown in Fig. 9, he will move the carriers downwardly into toasting position, as hereinbefore explained, and will cause contact arm 67 to be moved into engagement with contact 61, whereby the toast heating elements 25 are energized, as is also the tube 105, which latter provides a voltage on the order of 150 volts between the conductors 193 and 189. The operation of the filter condenser 191 is as has hereinbefore been explained. The direct current potential provided between conductors 193 and 189 causes a charging current to flow through the compensating resistor 151 and the adjustable timing resistor 187 into the electrostatic timing condenser 185. The condenser 185 is gradually charged, as has been hereinbefore set forth, until a potential of approximately 70 volts is caused to exist between the terminals thereof and therefore also between the starting anode 143 and the cathode 141. At this potential the tube fires or becomes conducting, so that a current will flow from the supply circuit conductors 119 and 123, through a circuit substantially as follows: from the first supply circuit conductor 119, through conductor 179, through the coil 195, through the tube 176, through conductor 189, through contact arm 67 and to fixed contact 61, and from there to the second supply circuit conductor 123. This current is therefore provided between supply circuit conductors and is therefore a pulsating current instead of being a direct current provided by the timing condenser 155 in the circuit shown in Fig. 8 of the drawings. This current flow will continue until the upward movement of the bread carriers, with attendant opening of the main switch and engagement of contact arm 67 with the second fixed contact 181. The timing condenser 185 will therefore be discharged through the conductor 183, contact arm 67 engaged with fixed contact 181, and through conductor 189 to the other terminal of condenser 185. This will ensure that the timing condenser 185 will be at substantially zero potential, so that there will be no effect of residual charges in the timing condenser to vary the time of a subsequent toasting operation.

Referring now to Fig. 10 of the drawings, I have there shown another modification of a circuit embodying my invention, adapted for use on direct current supply. I provide a pair of supply circuit conductors 196 and 197, the first conductor being connected to one terminal of the respective toast heating elements 25, the other terminal of which is connected to the fixed end of contact arm 67. The second conductor 197 is connected to the fixed contact 61.

I provide a minimum time resistor 199, one terminal of which is connected by a conductor 201 to the first supply circuit conductor 196. The other terminal of resistor 199 is connected to a manually adjustable timing resistor 203, the other terminal of which is connected to a conductor 205 which extends from fixed contact 181 to the grid 143 of a gas triode glow discharge tube 176. A timing condenser 207 has one of its terminals connected to conductor 205, while its other terminal is connected to a conductor 209, which extends from the fixed end of contact arm 67 to the cold cathode 141. An electromagnetic coil 211 is connected between conductor 201 and the plate 145. An additional resistor 213, which is adapted to be subject to the temperature of the toasting chamber, is connected to the junction of resistors 199 and 203 and to conductor 205.

If the operator desires to effect toasting of one or more slices of bread, he will move the knob 59 downwardly to cause downward movement of the carriers 33 and the bread thereon into toasting position and attendant closure of the main heater control switch, as hereinbefore described. The direct current potential provided between supply circuit conductors 196 and 197, and therefore between conductors 201 and 209, will cause charging of the electrostatic condenser 207 through the resistor 199 and the two resistors 203 and 213 connected in parallel with each other. Charging of the condenser 207 will proceed until it has been charged to a potential on the order of 70 volts, at which potential between the grid 143 and the cathode 141, the tube 176 becomes conducting or fires, with the result that an electric current will flow through the following circuit: from the first supply circuit conductor 196, conductor 201, coil 211, tube 176, through conductor 209, through contact arm 67, through contact 61, and from there to the second supply circuit conductor 197. This will energize coil 211 of the electromagnetic latch release, with attendant release of the carriers from their toasting position and quick upward movement thereof into non-toasting position, with attendant movement of the contact arm 67 into engagement with fixed contact 181. This latter engagement will cause a discharge of the condenser 207 through conductors 205 and 209 and through the engaged contact arm 67 and fixed contact 181.

The use of the compensating resistor 213 causes a reduction in the resistance of the charging circuit of condenser 207, with increase of temperature of the toaster; and it is only necessary to properly select the resistances of resistor 199 and 213 and of the manually adjustable resistor 203 to permit of obtaining substantially the same degree of toasting of successive slices of bread, in spite of rise of temperature of the toaster, as well as to permit of obtaining any desired degree of toasting by manual adjustment of the resistance included in the circuit of resistor 203.

I have shown three different circuits in which the timing resistor and the compensating resistors are connected in different circuits with each other and with the electron tube, which is normally non-conductive but which becomes conductive when subjected to a predetermined potential. It is obvious that other changes in the connections and in the values of the resistances of the resistors could be made and still obtain the desired results, which are in general that successive slices of bread shall be toasted to the same degree, if desired, irrespective of variations of temperature of the toaster, because of quickly successive cycles of operation or because of high or low voltages on the supply circuit, as well as obtaining any desired degrees of toasting of successive slices of bread, irrespective of such changes of temperature.

Various other modifications may be made in the system embodying my invention without departing from the spirit and scope thereof, and all such modifications clearly coming within the scope of the appended claims are to be considered as covered thereby.

I claim as my invention:

1. In an automatic electric toaster, the combination with electric toast heating means, a control switch for said toast heating means normally yieldingly biased to open position and including a movable contact arm, a bread carrier movable into toasting and non-toasting positions relatively to said toast heating means and normally yieldingly biased into non-toasting position, means for moving said control switch into circuit-closing position and said carrier into toasting position to start a toasting operation and an electromagnetically releasable latch for holding said switch in closed position and said carrier in toasting position, of means for effecting release of said latch and termination of a toasting operation comprising a normally non-conducting non-light-sensitive electron tube, an electrostatic timing condenser connected in parallel circuit with said tube, a timing resistor connected in series circuit with said condenser, means for charging said condenser through said resistor until the potential is that at which the tube becomes conducting, electric connections between the tube and the coil of said electromagnetic latch release to cause the current traversing said tube to energize the coil of said latch release and cause release thereof and termination of a toasting operation, said contact arm being adapted to short-circuit said timing condenser when in heater deenergizing position.

2. In an automatic electric toaster, the combination with a toasting chamber, electric toast heating elements in said chamber, a bread carrier in said chamber movable into toasting and non-toasting positions relatively to said toast heating elements and normally yieldingly biased into non-toasting position, means for moving said carrier into toasting position to start a toasting operation and an electromagnetically releasable latch means for holding said carrier in toasting position, of means for causing energization of said electromagnetically releasable latch to terminate a toasting operation comprising a non-light-sensitive normally non-conducting electron tube, an initially completely discharged electrostatic timing condenser connected in parallel with said tube, a plurality of timing resistors connected in series with said timing condenser, a source of direct current for charging said condenser through said resistors until the potential of said condenser is substantially that at which said tube becomes conducting and electric connections between said tube, said condenser and the coil of said electromagnetic release means to cause the current traversing the tube to traverse the coil of said release means and cause release of said latch to terminate a toasting operation, one of said resistors having a negative temperature coefficient of resistance and being subject to heat from said toast heating elements to ensure substantially uniform toasting of successive slices of bread irrespective of changes of temperature of the toaster.

3. In an automatic electric toaster, the combination with a toasting chamber, electric toast heating elements in said chamber, a bread carrier in said chamber movable into toasting and non-toasting positions relatively to said toast heating elements and normally yieldingly biased into non-toasting position, means for moving said carrier into toasting position to start a toasting operation and an electromagnetically releasable latch means for holding said carrier in toasting position, of means for causing energization of said electromagnetically releasable latch to terminate a toasting operation comprising a non-light-sensitive normally non-conducting electron tube, an initially completely discharged electrostatic timing condenser connected in parallel with said tube, a plurality of timing resistors connected in series with said timing condenser, a source of direct current for charging said condenser through said resistors until the potential of said condenser is substantially that at which said tube becomes conducting and electric connections between said tube, said condenser and the coil of said electromagnetic release means to cause the current traversing the tube to traverse the coil of said release means and cause release of said latch to terminate a toasting operation, one of said resistors having a negative temperature coefficient of resistance and being subject to heat from said toast heating elements to ensure substantially uniform toasting of successive slices of bread irrespective of changes of temperature of the toaster and of changes in the voltage of the supply circuit energizing said toast heating elements and a second resistor being manually adjustable to predetermine the degree of toasting.

4. In an automatic electric toaster, the combination with a toasting chamber, electric toast heating elements in said chamber, a bread carrier in said chamber movable into toasting and non-toasting positions relatively to said toast heating elements and normally yieldingly biased into non-toasting position, means for moving said carrier into toasting position to start a toasting operation and an electromagnetically releasable latch means for holding said carrier in toasting position, of means for causing energization of said electromagnetically releasable latch to terminate a toasting operation comprising a non-light-sensitive normally non-conducting electron tube, an initially completely discharged electrostatic timing condenser connected in parallel with said tube, a plurality of timing resistors operatively connected with said timing condenser, a source of direct current for charging said condenser through said resistors until the potential of said condenser is substantially that at which said tube becomes conducting and electric connections between said tube, said condenser and the coil of said electromagnetic release means to cause the current traversing the tube to traverse the coil of said release means and cause release of said latch to terminate a toasting operation, one of said resistors being manually adjustable to predetermine the degree of toasting obtained in a toasting operation and the other of said resistors being automatically adjustable in response to the temperature of the heating elements.

5. In an automatic electric toaster, the combination with a toasting chamber, electric toast heating elements in said chamber, a bread carrier in said chamber movable into toasting and non-toasting positions relatively to said toast heating elements and normally yieldingly biased into non-toasting position, means for moving said carrier into toasting position to start a toasting operation and an electromagnetically releasable latch means for holding said carrier in toasting position, of means for causing energization of said electromagnetically releasable latch to terminate a toasting operation comprising a non-light-sensitive normally non-conducting electron tube, an initially completely discharged electrostatic timing condenser connected in parallel with said tube, a plurality of timing resistors connected in series with said timing condenser, a source of direct current for charging said condenser through said resistors until the potential of said condenser is substantially that at which said tube becomes conducting and electric connections between said tube, said condenser and the coil of said electromagnetic release means to cause the current traversing the tube to traverse the coil of said release means and cause release of said latch to terminate a toasting operation, one of said resistors having a negative temperature coefficient of resistance and being subject to heat from said toast heating elements to ensure substantially uniform toasting of successive slices of bread irrespective of changes of temperature of the toaster and of changes in the voltage of the supply circuit energizing said toast heating elements and another one of said resistors being manually-adjustable to predetermine the degree of toasting obtained in a toasting operation.

6. In an automatic electric toaster, the combination with a toasting chamber, electric toast heating elements in said chamber adapted to be energized by an A. C. source, a contact arm normally yieldingly biased to heater deenergizing position, a bread carrier in said chamber movable into toasting and non-toasting positions relatively to said heating elements and normally yieldingly biased into non-toasting position, means for manually moving said contact arm into heater energizing position and said carrier into toasting position and an electromagnetically releasable latch means for holding said carrier in toasting position and said contact arm in heater energizing position, of means for causing release of said latch means to terminate a toasting operation comprising a normally non-conducting gas type triode glow discharge electron tube, an electrostatic timing condenser connected in parallel circuit with said tube, a timing resistor connected in series circuit with said timing condenser, a double diode half-wave rectifier tube for charging said condenser through said resistor until the potential of said condenser is substantially that at which said glow discharge tube becomes conducting, electric connections between said glow discharge tube, the coil of said electromagnetic release means and said A. C. source to cause an A. C. current from said source to traverse said glow discharge tube and said coil and cause release of said latch to terminate a toasting operation, said contact arm being adapted to cause full discharge of said timing condenser when in heater deenergizing position.

7. In an automatic electric toaster, the combination with electric toast heating elements, of a timing circuit comprising a timing condenser, a plurality of timing resistors in series electric circuit with said condenser, a contact arm normally yieldingly biased to open position for controlling the energization of said toast heating elements and said timing circuit, means to cause closing movement of said contact arm to energize said toast heating elements and to initiate progressive change in the charge on said condenser, a non-light-sensitive electron tube connected in parallel with said condenser and responsive to a predetermined potential across said condenser, means controlled by said electron tube to cause opening movement of said contact arm when said progressive change produces said predetermined potential, all of said plurality of timing resistors being in said timing circuit when starting cold to retard said progressive change and to prolong the timing cycle and thermally-actuable means to shunt one of said resistors in response to rise in temperature of the toaster whereby a relatively long timing cycle results from cold start and whereby closely successive timing cycles are relatively short.

8. In an automatic electric toaster, the combination with electric toast heating elements for energization by an A. C. source, of a voltage-doubling rectifying arrangement for energization by said A. C. source, a timing circuit for energization by said voltage-doubling arrangement, said timing circuit including a timing condenser, a plurality of timing resistors connected in series circuit with said condenser and a non-light-sensitive electron tube responsive to a predetermined voltage across said condenser, normally open control means for said toast heating elements and said timing circuit, means to close said control means and energize said heating elements and initiate a progressive change in the charge on said condenser, means controlled by said electron tube to cause said control means to move to open position when said progressive change produces said predetermined potential, one of said resistors being effective to prolong the length of the first timing cycle starting cold and thermally-actuable means for shunting out said resistor in response to temperature rise in the toaster whereby closely successive following timing cycles are relatively short, a second resistor being manually adjustable to predetermine the degree of toasting obtained and a third resistor having a negative temperature coefficient of resistance and being subject to the temperature within the toaster to ensure substantially uniform toasting of successive slices of bread irrespective of the temperature of the toaster and of the voltage of the A. C. source.

9. In an automatic electric toaster, the combination with a toasting heater, a support for holding bread in position to be toasted by heat from said toasting heater, and a toasting control member movable to a toasting position for initiating a toasting operation and movable to a non-toasting position for terminating said toasting operation, of an electric timer for causing said toasting control member to move from a toasting to a non-toasting position for terminating a toasting operation, said electric timer including a timing condenser and timing resistor in a relaxation circuit for progressively charging said condenser, compensating means operating in response to toasting temperature for varying the charging rate of said condenser, an electronic valve operable in response to the increased charge of said condenser for causing actuation of said toasting control member to non-toasting position, and means for substantially interrupting the application of charging voltage to said condenser during the intervals between timed periods, said last means including a circuit control device actuated by said toasting control member.

10. The combination of the immediately preceding claim wherein said last means is operable for substantially discontinuing the application of charging voltage to said relaxation circuit during the intervals between timed periods and includes a switch actuated by said toasting control member.

11. In an automatic electric toaster, the combination with a toasting heater, a support for holding bread in position to be toasted by heat from said toasting heater, and a toasting control member movable to a toasting position for initiating a toasting operation and movable to a non-toasting position for terminating said toasting operation, of an electric timer for causing said toasting control member to move from a toasting to a non-toasting position for terminating a toasting operation, said electric timer including a timing condenser and timing resistor means in a relaxation circuit for progressively charging said condenser, said resistor means including resistance means variable in response to toasting temperature to vary the charging rate of said condenser, an electronic valve operable in response to the increased charge of said condenser for rapidly draining at least a part of the charge thereof, means responsive to the operation of said valve for causing actuation of said toasting control member to non-toasting position, and means for substantially discontinuing the application of charging voltage to said relaxation circuit during the intervals between timed periods, said last means including a switch actuated by said toasting-control member.

12. The combination of the immediately preceding claim wherein there is included a power supply having a condenser, such as a filter condenser, capable of delivering a charge to the timing condenser after the end of the timed period, there being also included a current path of sufficiently low electrical resistance for draining said power-supply condenser to a voltage too low to deliver a substantial charge to said timing condenser, and to do so in a time short compared to a timed toasting period.

13. In an automatic electric toaster, the combination with a toasting heater, a support for holding bread in position to be toasted by heat from said toasting heater, and a toasting control member movable to a toasting position for initiating a toasting operation and movable to a non-toasting position for terminating said toasting operation, of an electric timer for causing said toasting control member to move from a toasting to a non-toasting position for terminating a toasting operation, said electric timer including an electronic valve having anode, cathode and control electrode, a timing condenser connected to said control electrode, means for progressively changing the charge of said timing condenser for timing a toasting period, means thermally responsive to toasting temperature for varying the charging rate of said condenser means in circuit with said anode and cathode and controlled by the operation of said valve in response to the state of charge of said condenser for causing actuation of said toasting control member to non-toasting position at the end of said toasting period, and means for changing the charge on said timing condenser to a starting value in a time that is short compared to the toasting period, said last means including a switch on said toasting-control member.

14. The combination of the immediately preceding claim wherein said electronic valve is of the grid-controlled glow type, wherein said valve responds to said condenser charge by beginning a glow operation, and wherein a switch controlled by said toasting-control member terminates said glow operation.

15. The combination of claim 13 wherein said switch on said toasting control member occupies a switch position suitable for changing the charge on the timing condenser to said starting value at a time that precedes the starting of a timed period by an interval that is short compared to the length of the timed period.

16. In an automatic electric toaster, the combination with a toasting heater, energizing current supply means therefor a support for holding bread in position to be toasted by heat from said toasting heater, and a toasting control member movable to a toasting position for initiating a toasting operation and movable to a non-toasting position for terminating said toasting operation, of an electric timer operating from said energizing current supply means for causing said toasting control member to move from a toasting to a non-toasting position for terminating a toasting operation, said electric timer including a timing condenser and means for progressively varying the charge thereof, an electronic valve operable in response to the state of said charge on said condenser for causing actuation of said toasting control member to non-toasting position, and means connected to said condenser for controlling the charge thereof between successive timed periods, said means for controlling the charge between timed periods including a switch operable in response to movement of said toasting control member and circuit connections between said switch and condenser.

17. In an automatic electric toaster, the combination with a toasting heater, energizing current supply means therefor a support for holding bread in posititon to be toasted by heat from said toasting heater, and a toasting control member movable to a toasting position for initiating a toasting operation and movable to a non-toasting position for terminating said toasting operation, of an electric timer operating from said energizing current supply means for causing said toasting control member to move from a toasting to a non-toasting position for terminating a toasting operation, said electric timer including a timing condenser and means for progressively varying the charge thereof, an electronic valve operable in response to the state of said charge on said condenser for causing actuation of said toasting control member to non-toasting position, and means connected to said condenser for controlling the charge thereof between successive timed periods, said means for controlling the charge between timed periods including means actuated by said toasting control member and operable between said timed periods for substantially preventing said progressive change of the charge on said condenser and for restoring the charge of said condenser to a suitable starting value.

18. In an automatic electric toaster, the combination with a toasting heater, energizing current supply means therefor a support for holding bread in position to be toasted by heat from said toasting heater, and a toasting control member movable to a toasting position for initiating a toasting operation and movable to a non-toasting position for terminating said toasting operation, of an electric timer operating from said energizing current supply means for causing said toasting control member to move from a toasting to a non-toasting position for terminating a toasting operation, said electric timer including a timing condenser and means for progressively varying the charge thereof, an electronic valve operable in response to the state of said charge on said condenser for causing actuation of said toasting control member to non-toasting position, and means connected to said condenser for controlling the charge thereof between successive timed periods, said means for controlling the charge between timed periods including a switch operable in response to movement of said toasting control member for holding the charge at a predetermined initial value just before the beginning of a timed period.

19. In an automatic electric toaster the combination with a toasting chamber, electric toast heating means, a control switch for said heating means biased to open position and including a contact member, means to move said contact member into circuit closing position to start a toasting operation and a latch for holding said contact member in circuit closing position, of means for terminating a toasting operation comprising a normally nonconducting electron tube, at least one rectifier, an electrostatic timing condenser connected to said tube, a timing resistor connected between said rectifier and said timing condenser for charging said condenser to a potential at which the tube becomes conducting, said timing resistor having a negative temperature coefficient of resistance and being subject to toaster chamber temperature to vary the duration of a toasting operation in accordance with toaster temperature, means energized by the current traversing said tube for causing release of said latch and termination of a toasting operation and means controlled by said contact member for discharging said condenser upon termination of a toasting operation.

20. In an automatic electric toaster, the combination with a toasting heater, a support for holding bread in position to be toasted by heat from said toasting heater, and a toasting control member movable to a toasting position for initiating a toasting operation and movable to a non-toasting position for terminating said toasting operation, of an electric timer for causing said toasting control member to move from a toasting to a non-toasting position for terminating a toasting operation, said electric timer including a timing condenser and means for progressively varying the charge thereof, said last means including a resistor exposed to the heat from said toasting heater and responsive to said heat for changing the rate at which said charge is progressively varied, an electronic valve operable in response to the state of said charge on said condenser for causing actuation of said toasting control member to non-toasting position, and means connected to said condenser for controlling the charge thereof between successive timed periods.

21. In an automatic electric toaster, the combination with a toasting heater, a support for holding bread in position to be toasted by heat from said toasting heater, and a toasting control member movable to a toasting position for initiating a toasting operation and movable to a non-toasting position for terminating said toasting operation, of an electric timer for causing said toasting control member to move from a toasting to a non-toasting position for terminating a toasting operation, said electric timer including a timing condenser and means for progressively varying the charge thereof, said last means including a resistor exposed to the heat from said toasting heater and responsive to said heat for changing the rate at which said charge is progressively varied, and an electronic valve operable in response to the state of said charge on said condenser for causing actuation of said toasting control member to non-toasting position.

JOHN R. GOMERSALL.

REFERENCES CITED

The following references are of record in the file of this patent:

UNITED STATES PATENTS

| Number | Name | Date |
|---|---|---|
| 1,985,051 | Minkler | Dec. 18, 1934 |
| 2,024,019 | Wright | Dec. 10, 1935 |
| 2,061,011 | Vingerhoets | Nov. 17, 1936 |
| 2,076,774 | Graham | Apr. 13, 1937 |
| 2,110,748 | Tweedale | Mar. 8, 1938 |
| 2,151,705 | Lavenberg | Mar. 28, 1939 |
| 2,207,871 | Myers | July 16, 1940 |
| 2,207,946 | Sardeson | July 16, 1940 |
| 2,215,404 | Myers | Sept. 17, 1940 |
| 2,234,764 | Ireland | Mar. 11, 1941 |
| 2,302,117 | Gomersall | Nov. 17, 1942 |
| 2,364,998 | Palmer et al. | Dec. 12, 1944 |